United States Patent
Milanovic

(10) Patent No.: US 10,452,918 B1
(45) Date of Patent: Oct. 22, 2019

(54) AUTOMATICALLY CREATING TIME ENTRIES BASED ON A VIDEO SHOWING A USER'S SURROUNDINGS

(71) Applicant: Nenad Milanovic, San Francisco, CA (US)

(72) Inventor: Nenad Milanovic, San Francisco, CA (US)

( * ) Notice: Subject to any disclaimer, the term of this patent is extended or adjusted under 35 U.S.C. 154(b) by 0 days.

(21) Appl. No.: 16/264,122

(22) Filed: Jan. 31, 2019

(51) Int. Cl.
*G06K 9/00* (2006.01)
*H04N 5/232* (2006.01)

(52) U.S. Cl.
CPC ..... *G06K 9/00718* (2013.01); *G06K 9/00765* (2013.01); *H04N 5/23293* (2013.01); *G06K 2009/00738* (2013.01)

(58) Field of Classification Search
CPC . G06F 1/163; G06F 16/7837; C06K 9/00718; G06K 9/00765; G06K 9/6202; G06K 9/00671; G06K 9/00362; G06K 9/3233; G06K 2209/03; G06K 9/00604; G06K 9/00617; G06K 9/46; H04N 1/00095; H04N 1/00244; H04N 1/00307; H04N 2007/145; H04N 21/41407; H04N 5/2254; H04N 5/23293; H04N 5/225
See application file for complete search history.

(56) References Cited

U.S. PATENT DOCUMENTS

| 8,612,517 | B1* | 12/2013 | Yadid | H04N 21/25891 709/201 |
|---|---|---|---|---|
| 9,870,716 | B1* | 1/2018 | Rao | G09B 19/0092 |
| 2009/0307828 | A1* | 12/2009 | Ludlow | A61F 9/029 2/431 |
| 2013/0157229 | A1* | 6/2013 | Lauritzen | G09B 21/003 434/112 |
| 2013/0188032 | A1* | 7/2013 | Vertegaal | G06F 3/011 348/78 |
| 2014/0368980 | A1* | 12/2014 | Nanavati | G06Q 30/016 361/679.03 |
| 2015/0044648 | A1* | 2/2015 | White | G16H 20/30 434/236 |
| 2015/0161876 | A1* | 6/2015 | Castillo | G08B 21/0453 340/539.11 |
| 2015/0181314 | A1* | 6/2015 | Swanson | H04Q 9/00 340/870.07 |
| 2015/0317910 | A1* | 11/2015 | Daniels | G16H 20/30 84/485 R |

(Continued)

*Primary Examiner* — Jingge Wu
(74) *Attorney, Agent, or Firm* — Perkins Coie LLP

(57) ABSTRACT

Presented here are systems and methods to automatically determine an activity in which a person is engaged and to automatically create time entries based on the determination. The determination can be made using a machine learning model and/or computer vision. In one embodiment, video recorder can be mounted on an item worn by the user, such as glasses. The video recorder can record a video of the environment surrounding the user from the user's point of view, and a processor can identify objects and/or people within the video. Based on the identified objects and/or people, the processor can determine the activity in which the user is engaged as well as a duration of the activity. The processor can automatically create a time entry including the activity as well as the duration of the activity.

19 Claims, 13 Drawing Sheets

(56) References Cited

U.S. PATENT DOCUMENTS

| | | | | |
|---|---|---|---|---|
| 2015/0348243 | A1* | 12/2015 | Sutou | G02C 11/10 |
| | | | | 348/207.1 |
| 2016/0037482 | A1* | 2/2016 | Higgins | H04W 68/005 |
| | | | | 455/414.1 |
| 2016/0071541 | A1* | 3/2016 | Miner | H04N 9/8205 |
| | | | | 386/223 |
| 2017/0257595 | A1* | 9/2017 | Newell | H04N 5/77 |
| 2017/0316157 | A1* | 11/2017 | Riedel | G16H 15/00 |
| 2018/0272236 | A1* | 9/2018 | Mulcahy | H04W 4/023 |

* cited by examiner

FIG. 7

AUTOMATICALLY CREATING TIME ENTRIES BASED ON A VIDEO SHOWING A USER'S SURROUNDINGS

TECHNICAL FIELD

The present application is related to automatically creating time entries, and more specifically to methods and systems that automatically create time entries based on a video showing a user's surroundings.

BACKGROUND

Keeping track of a person's time is necessary in many industries where the person's compensation depends on the amount of time worked, such as legal industry, accounting industry, etc. Keeping track of the person's time is also useful for personal scheduling. There is currently no method to automatically determine an activity the person is engaged in and automatically create time entries based on the determination.

SUMMARY

Presented here are systems and methods to automatically determine an activity in which a person is engaged and to automatically create time entries based on the determination. The determination can be made using a machine learning model and/or computer vision. In one embodiment, a video recorder can be mounted on an item worn by the user, such as glasses. The video recorder can record a video of the environment surrounding the user from the user's point of view, and a processor can identify objects and/or people within the video. Based on the identified objects and/or people, the processor can determine the activity in which the user is engaged as well as a duration of the activity. The processor can automatically create a time entry including the activity as well as the duration of the activity.

BRIEF DESCRIPTION OF THE DRAWINGS

FIG. 7 shows a creation of time entries based on the identified activities.

DETAILED DESCRIPTION

Automatic Time Entry Creation

Presented here are systems and methods to automatically determine an activity in which a person is engaged and to automatically create time entries based on the determination. The determination can be made using a machine learning model and/or computer vision. In one embodiment, a video recorder can be mounted on an item worn by the user, such as glasses. The video recorder can record a video of the environment surrounding the user from the user's point of view, and a processor can identify objects and/or people within the video. Based on the identified objects and/or people, the processor can determine the activity in which the user is engaged as well as a duration of the activity. The processor can automatically create a time entry including the activity as well as the duration of the activity.

Figure 1:
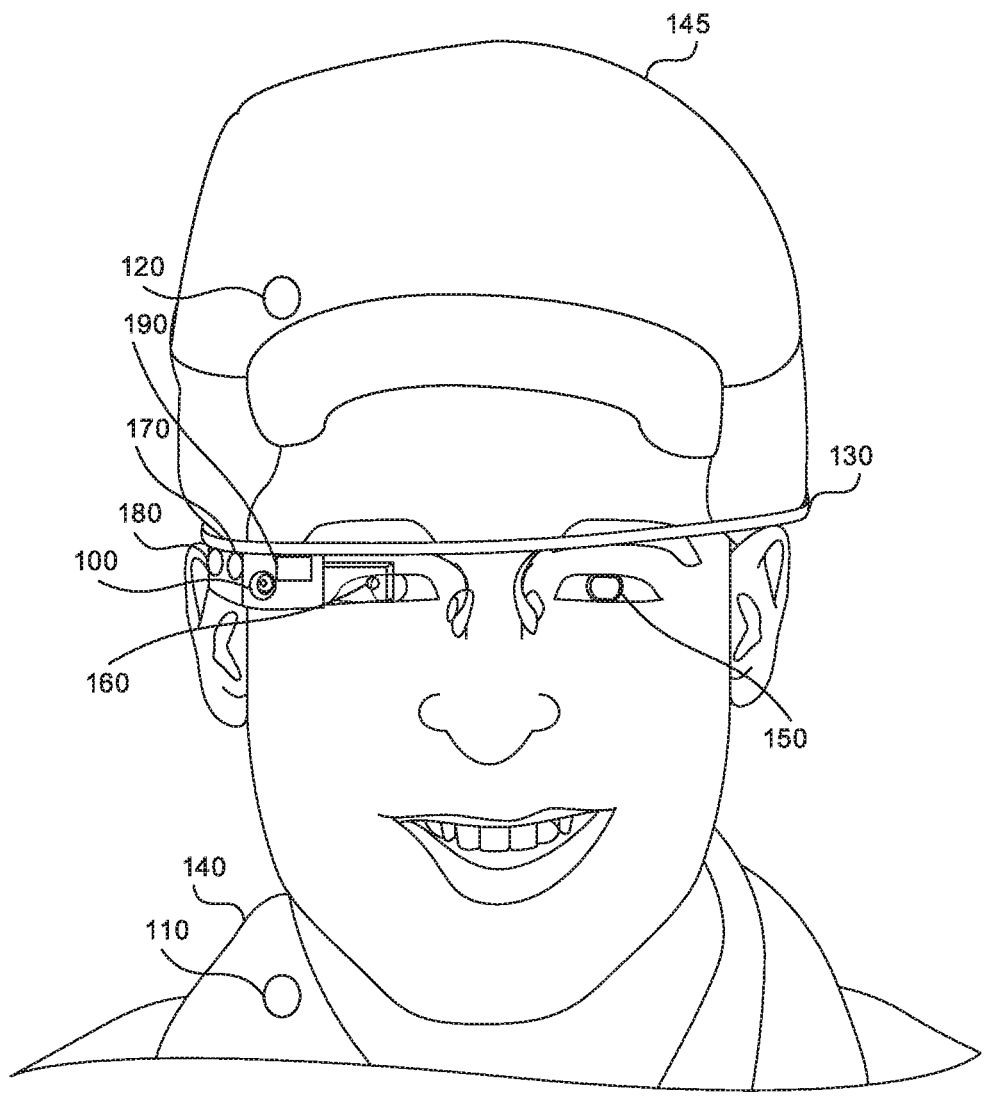
FIG. 1 shows a system to automatically determine an activity in which the user is engaged, and to record that activity.

FIG. 1 shows a system to automatically determine an activity in which the user is engaged, and to record that activity. An image recorder 100, 110, 120 can be worn by a user. The image recorder 100, 110, 120 can be mounted on an item worn by the user such as glasses 130; a clothing item, such as a shirt collar 140, a hat 145; a contact lens 150; etc. The image recorder 100, 110, 120 can record images and/or videos of the environment surrounding the user. The image recorder 100, 110, 120 can be a video recorder.

A projector 160, a microphone 170 and/or an audio emitter 180 can be in communication with the image recorder 100, 110, 120. The projector 160, the microphone 170 and/or the audio emitter 180 can be mounted on the same item worn by the user such as glasses 130, or on a different item and/or device. For example, the projector 160, the microphone 170 and/or the audio emitter 180 can be associated with the mobile device of the user.

The projector 160 can provide visual information to the user, the microphone 170 can record the user's voice, while the audio emitter 180 can provide audio information to the user. The projector 160, the microphone 170 and/or the audio emitter 180 can present questions to the user, when a disambiguation is required.

The image recorder 100, 110, 120 can communicate with one or more processors 190. The one or more processors 190 can be associated with the item worn by the user such as the glasses 130, and/or can be associated with a remote processor such as a processor of a mobile device, a processor of a smartwatch, a processor associated with an Internet server, etc.

The one or more processors 190 can determine, based on the video, an activity in which the user is engaged and an amount of time the user is engaged in the activity. The one or more processors 190 can create a time entry including the activity and the amount of time the user is engaged in the activity. For example, the processor associated with the item worn by the user can receive the video from the image recorder 100, 110, 120, and can send the video to a remote processor, such as a mobile device processor, processor of a personal assistant, a processor associated with the Internet, etc. The remote processor can determine the activity in which the user is engaged and the amount of time the user is engaged in the activity. The remote processor and/or the local processor can create the time entry including the activity in the amount of time.

Figure 2:
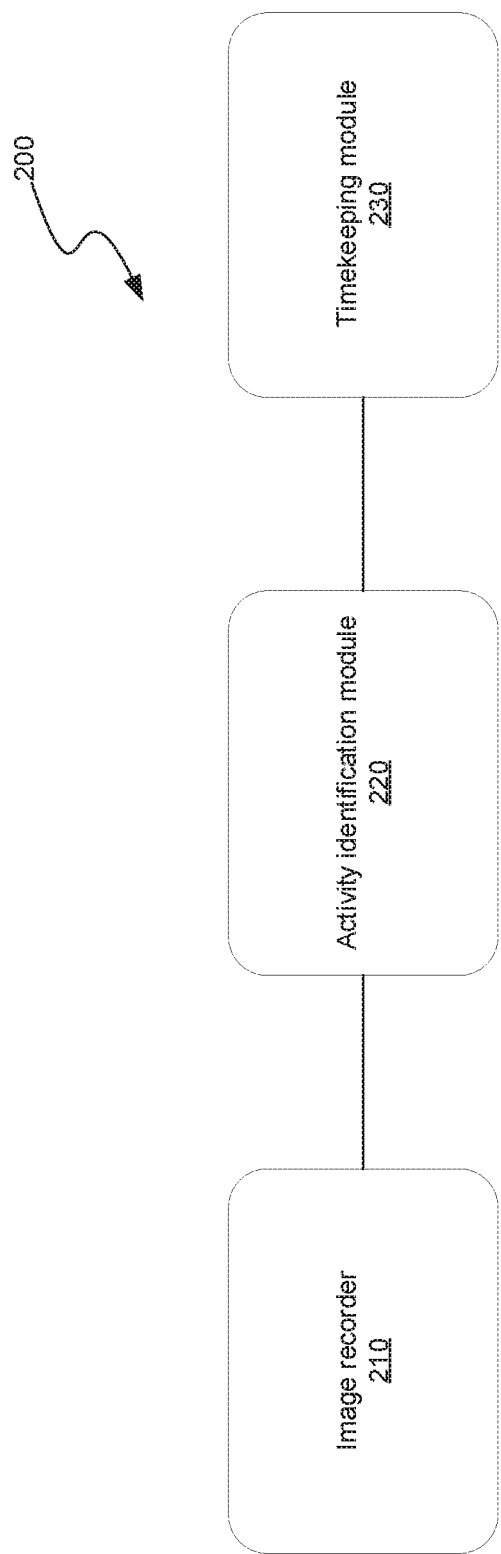
FIG. 2 shows components of a system to automatically determine an activity in which the user is engaged, and to record that activity.

FIG. 2 shows components of a system to automatically determine an activity in which the user is engaged, and to record that activity. The system 200 includes an image recorder 210, an activity identification module 220, and a timekeeping module 230.

The image recorder 210 can be a video recorder. The image recorder 210 can be mounted on an item associated with the user such as glasses 130 in FIG. 1. The image recorder 210 can record images, including a video, of an environment surrounding the user.

The activity identification module 220 can determine an activity in which the user is engaged based on the video and an amount of time the user is engaged in the activity. The activity identification module 220 can be a machine learning model, such as a neural network, and/or activity identification module 220 can utilize computer vision object recognition algorithms. The activity identification module can run on a remote processor, or on a local processor 190 in FIG. 1. The activity identification module 220 can detect a person in the video and can also perform face identification (ID) from the video.

The timekeeping module 230 can record a time entry including the activity and the amount of time the user is engaged in the activity. The timekeeping module 230 can be a timekeeping software such as Clockify, Intapp Time, TSheets, Buddy Punch, Synerion, IDEABlox, WorkMax Time, Replicon, etc.

Figure 3:
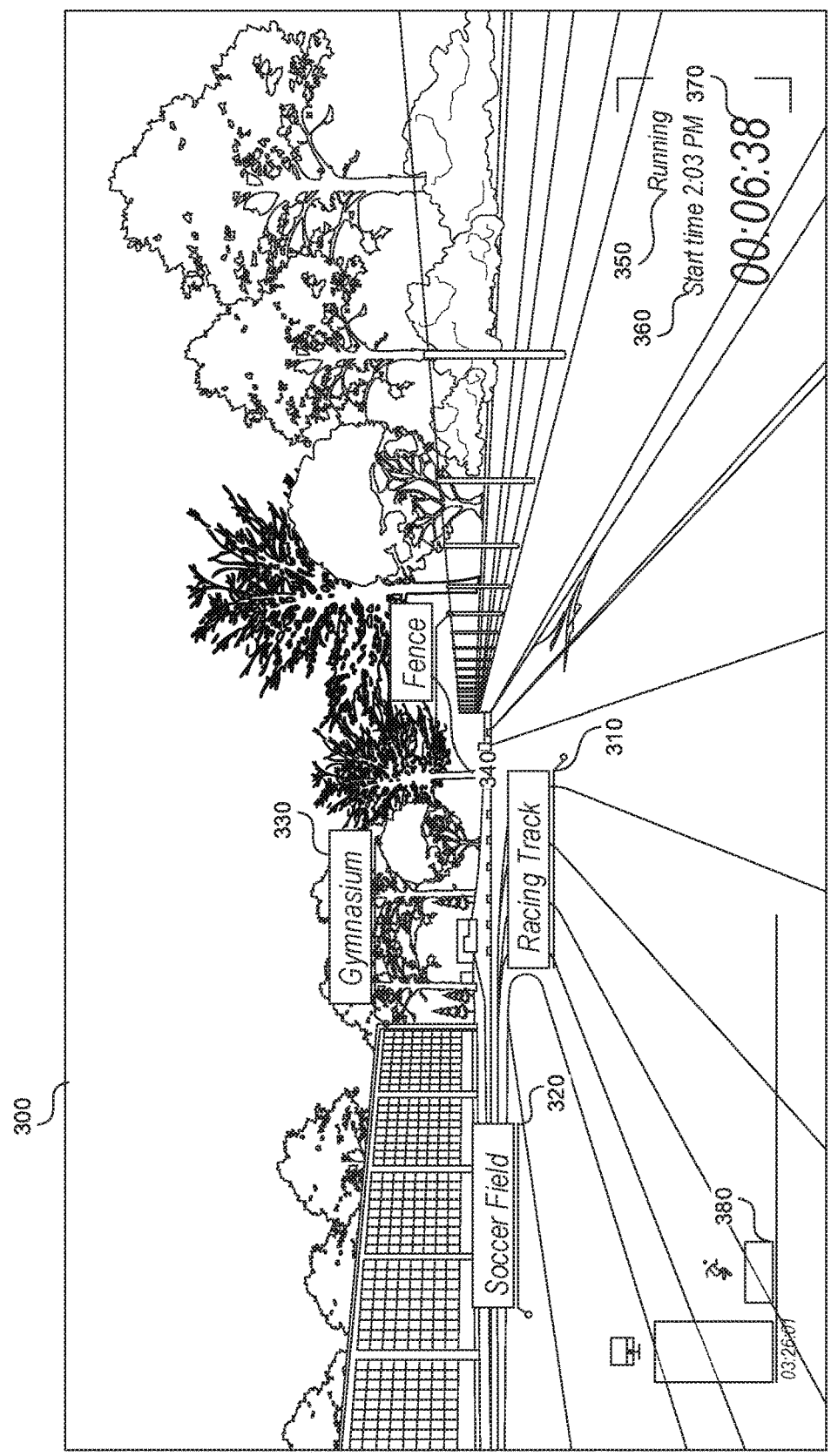
FIG. 3 shows an image recorded by an image recorder and objects identified within the image.

FIG. 3 shows an image recorded by an image recorder and objects identified within the image. The image 300 can record what the user sees from the user's point of view. The activity identification module 220 in FIG. 2 can identify objects and/or people within the image 300, such as the racing track 310, soccer field 320, gym 330, fence 340. The activity identification module 220 can determine the activity based on the objects and/or people identified within the image 300.

For example, the activity identification module 220 can be a machine learning model trained using images perceived by other users engaged in various activities, where the machine learning model identifies the objects within the image and identifies the activity the other users engaged in while perceiving the image. The activity identification module 220 can be a statistical model correlating various objects to various activities. So, when the activity identification module 220 identifies the racing track 310, the soccer field 320, the gymnasium 330, and the fence 340, the activity identification module 220 can identify that the user is exercising, and/or more specifically running.

The projector 160 in FIG. 1 can show the identified activity 350, the start time 360, the duration 370, etc. The projector 160 can also show a bar graph 380 of the duration of the identified activity 350. The information 350, 360, 370, 380 can also be shown on a display of a device associated with the user such as a smartwatch, mobile device, Fitbit, etc.

Figure 4:
FIG. 4 shows examples of devices that can be used in determining the user's current activity, according to one embodiment.

FIG. 4 shows examples of devices that can be used in determining the user's current activity, according to one embodiment. In addition to the images obtained from the image recorder 400, the activity identification module 220 in FIG. 2 can also receive data from other devices associated with the user such as accelerometer and/or a GPS associated with an item associated with the user such as the glasses 130 in FIG. 1, a mobile device, a smartwatch 410, a Fitbit, a contact lens, etc. The data from the other devices can indicate the speed of motion of the user. Based on the objects identified within the image 300, and/or the speed of motion of the user, the activity identification module 220 can identify whether the user is walking, running, bicycling, scooting, driving, etc.

Activity identification module 220 can receive other types of data from other devices, such as data from the user's calendar (location of meeting, time and place), data from the user's email, data from to-do list software, previous time entries associated with the user, etc., to determine the activity that the user is engaged in. For example, the user's calendar can indicate that the user is currently in a meeting. The user's email can indicate that the user is planning to exercise at a particular time. The to-do list software can provide a list of potential activities that the user is engaged in, and the activity identification module 220 can find an activity in the to-do list that most closely matches the objects identified in the image 300 in FIG. 3. The activity identification module 220 can also obtain previous time entries that the user has made and find an activity in the previous time entries that most closely matches the objects identified in the image 300 in FIG. 3.

Figure 5A:
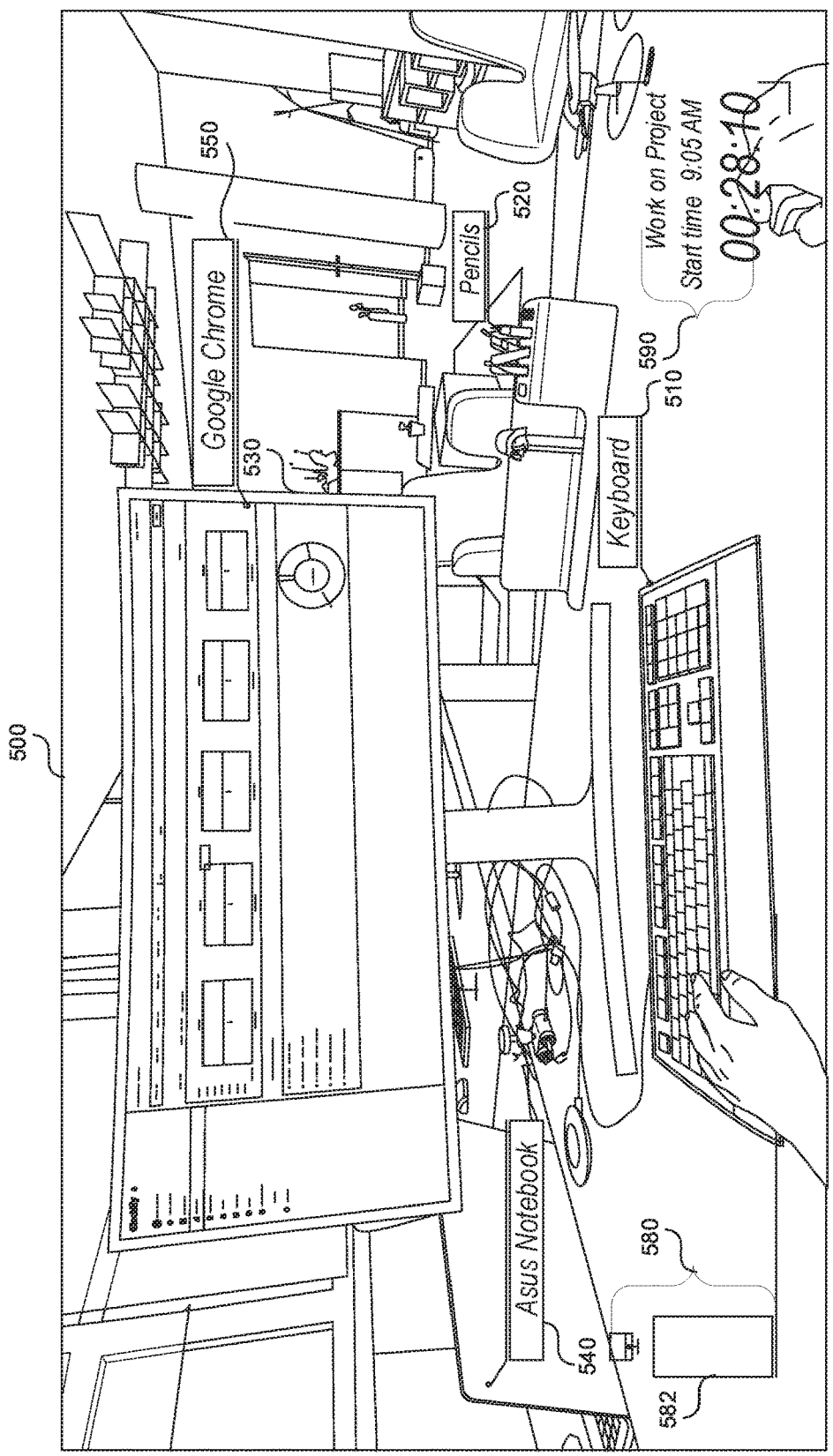
FIGS. 5A-B show examples of devices that can be used in determining the user's current activity, according to another embodiment.
Figure 5B:
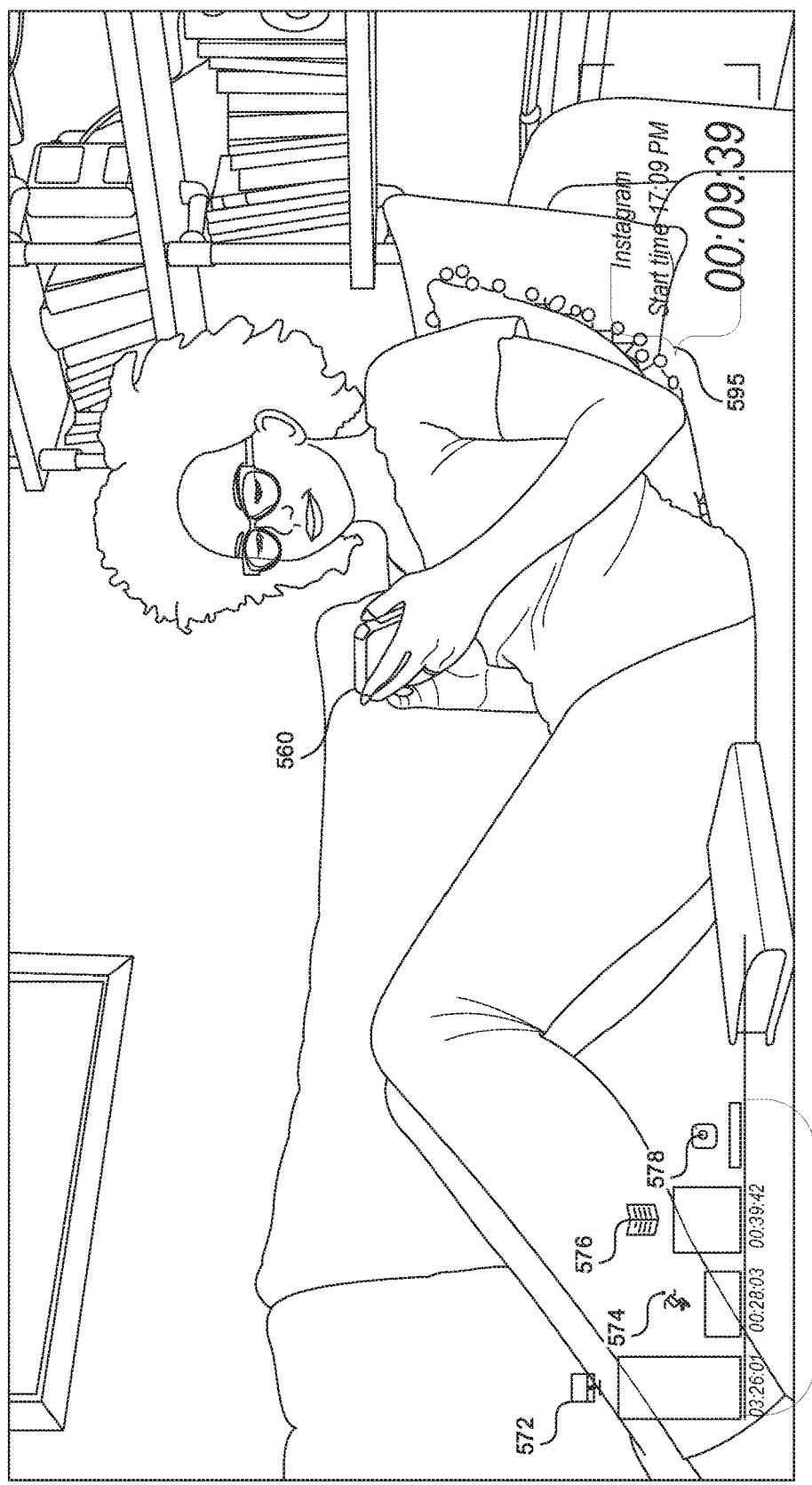

FIGS. 5A-B show examples of devices that can be used in determining the user's current activity, according to another embodiment. Image 500 in FIG. 5A shows an image recorded by the image recorder 100, 110, 120 in FIG. 1. The image 500 indicates what the user sees. The activity identification module 220 can identify various objects within the image 500, such as a keyboard 510, pencils 520, monitor 530, device 540.

The activity identification module 220 can identify a software application 550 displayed by the monitor 530. In one example, the activity identification module 220 can identify the software application by recognizing and analyzing text displayed on the monitor 530. By analyzing text in the image 500, the activity identification module 220 can determine the project the user was working on, and a length of time the user was working on the project, and create a time entry including the project and the length of time.

The activity identification module 220 can identify devices shown in the image 500, such as the Asus notebook 540. The activity identification module 220 can determine a time when the image 500 was taken. The activity identification module 220 can discover a network address of the Asus notebook 540 and communicate directly with the Asus notebook 540. The activity identification module 220 can request from the Asus notebook 540 information about the interaction with the user, such as the software application 550 the user is currently interacting with, or the software application 550 the user was interacting with at the time when the image 500 was taken. In addition, the activity identification module 220 can request the state of the software application 550, such as a project the user was interacting with in the software application. Based on information received from the device 540, the activity identification module 220 can determine the activity in which the user was engaged. For example, the activity identification module 220 can determine the project the user was working on, and a length of time the user was working on the project, and create a time entry including the project and the length of time.

In FIG. 5B, the user is interacting with a mobile device 560. As described above, the activity identification module 220 can recognize the software application the user is interacting with by analyzing text of an image recorded by the image recorder 100, 110, 120, or by communicating with the device 560. In FIG. 5B, the activity identification module 220 can identify that the software application the user is interacting with is Instagram.

The projector 160 in FIG. 1 can provide information 570, 580, 590, 595 to the user within the user's visual field to indicate an amount of time spent on various activities 572, 574, 576, 578, 582. Various activities can include only the current activity 582, 578, all the identified activities within the last 24 hours, all the identified activities after the user woke up, a predetermined number of activities such as the last three activities, or a predetermined number of activities in which the user has spent the most amount of time.

The projector 160 can display a histogram 570, 580 comparing various activities 572, 574, 576, 578, 582 based on an amount of time spent on each activity. In addition, the projector 160 can display information about the about the current activity 590, 595 indicating start time, total duration, and/or the identified activity.

Figure 6:
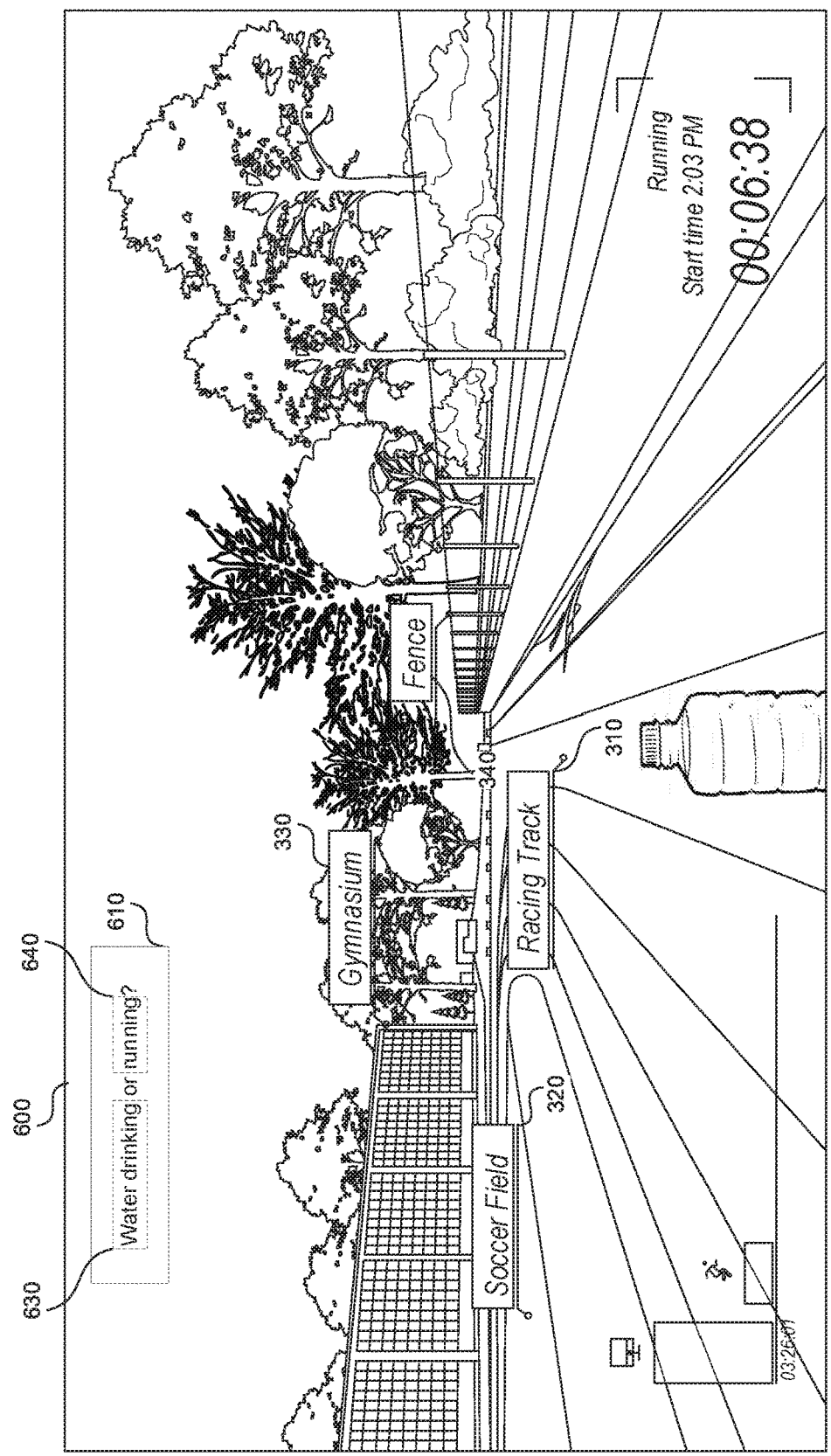
FIG. 6 shows an interaction between the user and the system described in this application.

FIG. 6 shows an interaction between the user and the system described in this application. The user can perform multiple activities at the same time. For example, the processor can identify in the video a water bottle 620 indicating that the user is drinking water, and elements 310, 320, 330, 340 indicating that the user is running. Consequently, the processor can identify at least two activities in which the user can be engaged. The processor can run the activity identification module 220 in FIG. 2.

In one embodiment, to identify which of the activities is the primary activity that should be recorded in the time entry, the processor can request from the user to select the activity from the at least two activities. Upon receiving a selection from the user, the processor can create the time entry including the activity and the amount of time the user is engaged in the activity.

To make the request, the processor can instruct the projector 160 in FIG. 1 to present the request in the form of text 610 within the user's field of view 600. In another example, to make the request, the processor can instruct the audio emitter 180 in FIG. 1 to play an audio request to the user. To receive the response from the user, the processor can utilize the microphone 170 in FIG. 1 to record the user's vocal response. The processor can perform speech recognition to interpret the user's response. Alternatively, when the request is in the form of text displayed within the user's field of view 600, the processor can track the user's eye movement, and allow the user to perform the selection by focusing on the text describing first activity 630 or the text describing second activity 640.

In another embodiment, to identify which of the activities is the primary activity that should be recorded in the time entry, the processor can obtain previously defined categories. The processor can obtain the previously defined categories from the user as a list of daily activities in which the user usually engages. The processor can obtain the previously defined categories from a history of activities associated with the user such as previous time entries associated with the user, or from a database storing the activities identified by the processor.

Specifically, the processor can determine multiple activities in which the user is engaged based on the video of the environment surrounding the user. The processor can obtain multiple categories indicating a history of activities associated with the user, such as previous time entries associated with the user. The processor can determine the primary activity among the multiple activities by identifying within the multiple activities the activity that appears in the history of activities. If there are multiple activities that appear in the history of activities, the processor can create two time entries for each activity, or the processor can request the user to select one of the activities as described in this application.

The processor can pick one of the activities based on the time of day. For example, if the current time is 6 AM, the history of activities shows that the user tends to run at 6 AM, and two candidates for the primary activity are running and drinking water, the processor can select running as the primary activity, and discard water drinking and the rest of the identified activities not designated as primary.

Figure 7:
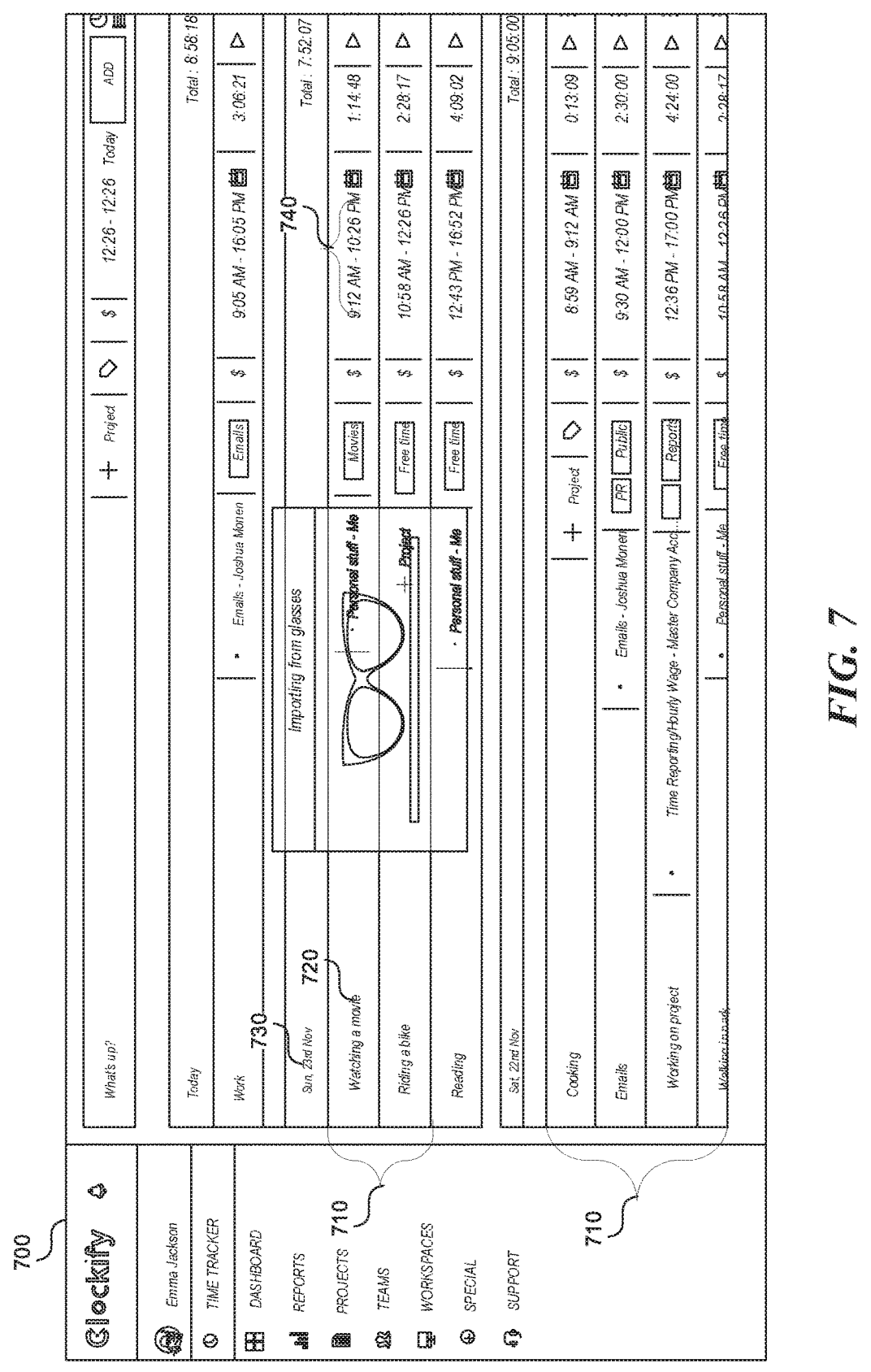

FIG. 7 shows a creation of time entries based on the identified activities. A timekeeping software 700, such as Clockify, Intapp Time, TSheets, Buddy Punch, Synerion, IDEABlox, WorkMax Time, Replicon, etc., can import the identified activity and the amount of time the user engaged in the identified activity from a processor. The processor can be associated with an item worn by the user such as the glasses 130 in FIG. 1. The timekeeping software 700 can create a list of time entries 710 containing the identified activity 720 (only one labeled for brevity), a date in which the activity occurred 730 (only one labeled for brevity), start and stop time of the activity 740 and/or an amount of time the user engaged in the activity. The list of time entries 710 can provide the history of activities of the user, i.e., multiple categories of activities, as described in this application. The list of time entries 710 can aid in identifying the current activity of the user.

Figure 8:
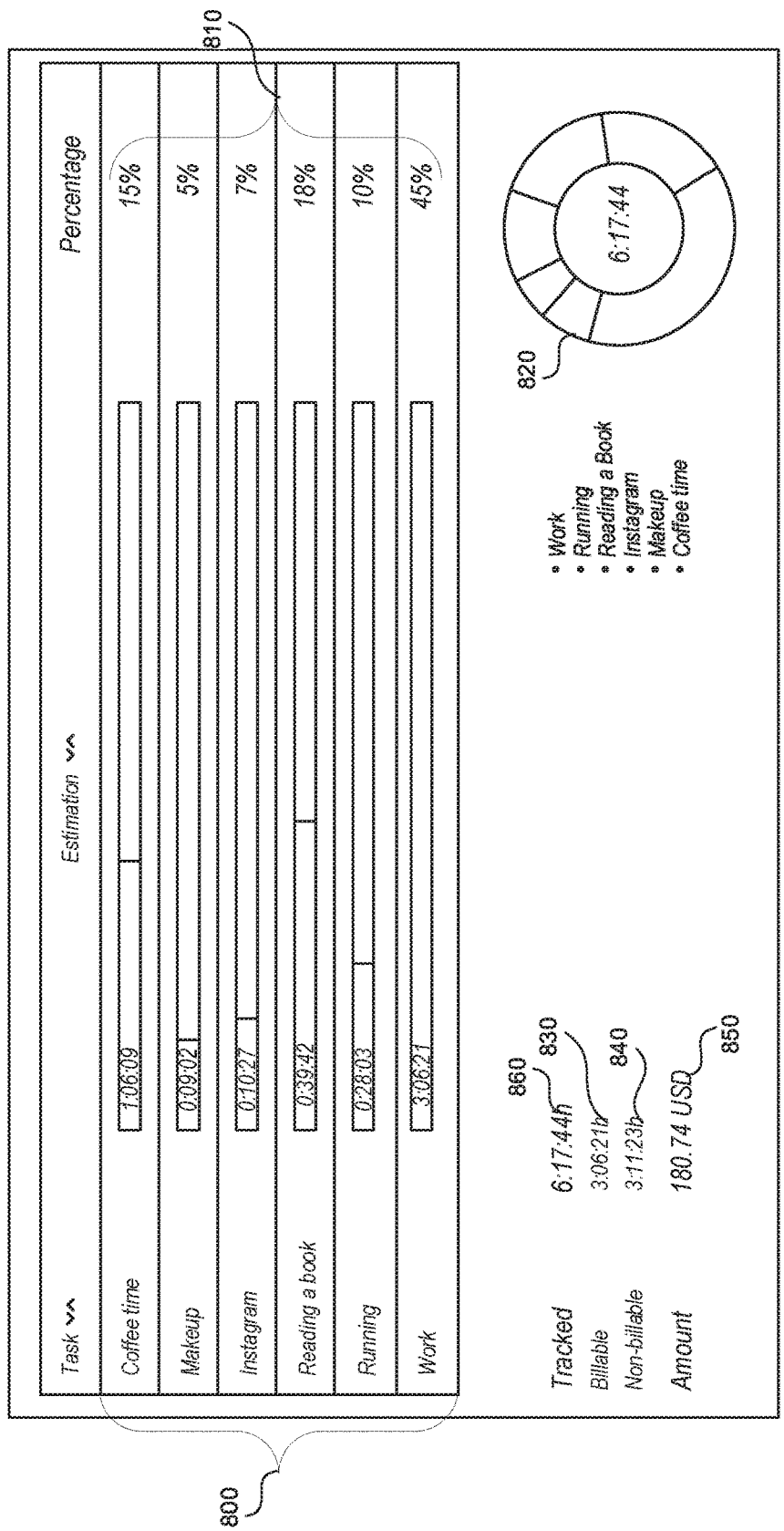
FIG. 8 shows an analysis of user's time entries.

FIG. 8 shows an analysis of the user's time entries. The timekeeping software 700 in FIG. 8 can produce an analysis of the user's time entries. The timekeeping software 700 can analyze multiple time entries to obtain a comparison between the amount of time the user has spent engaged in various activities. The comparison can be presented as a bar graph 800, percentage comparison 810, and/or a pie chart 820. The timekeeping software 700 can provide information about how many hours can be billed to a client 830, how many of the hours cannot be billed 840, and/or a total amount of money that can be billed 850. In addition, the timekeeping software 700 can present the total amount of the time tracked 860.

Figure 9:
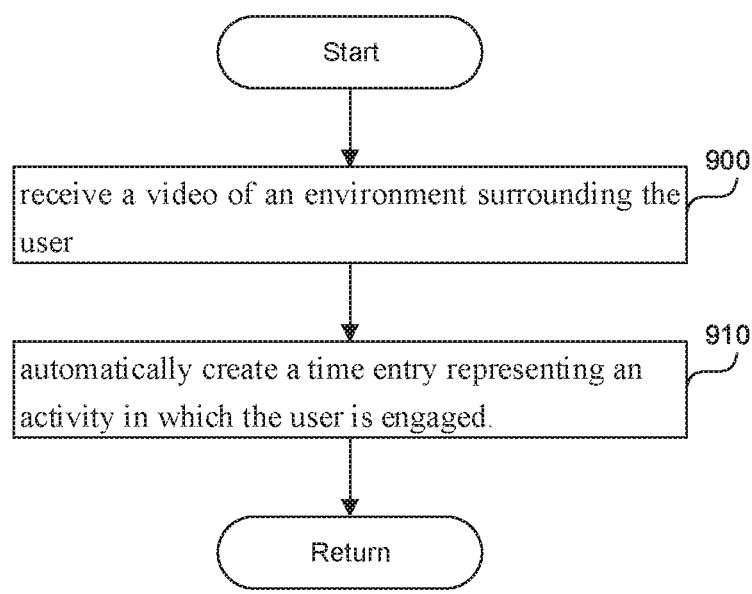
FIG. 9 is a flowchart of a method to create a time entry by automatically identifying activity in which the user is engaged.

FIG. 9 is a flowchart of a method to create a time entry by automatically identifying activity in which the user is engaged. In step 900 a processor can receive an image, such as a video, point cloud, etc. of an environment surrounding the user. The video can show the user's field of view and can include an entity, such as an object or a person, the user is focused on. The processor can execute instructions of the activity identification module 220 in FIG. 2 and/or the timekeeping module 230 in FIG. 2.

In step 910, the processor can automatically create a time entry representing an activity in which the user is engaged by determining, based on the video of the environment surrounding the user, an amount of time the user is engaged in the activity and the activity in which the user is engaged. The time entry can be automatically imported into a timekeeping software, such as 700 in FIG. 7, and recorded in a database associated with the timekeeping software. The timekeeping software can analyze multiple time entries including the time entry to obtain a comparison between multiple activities associated with the multiple time entries and can present the comparison to the user, as explained in FIG. 8.

To determine the activity the user is engaged in, the processor can identify one or more entities associated with the activity within the video. The entities can include a person and/or an object, as explained in FIGS. 3, 5A. The processor can determine the activity in which the user is engaged based on the identified entity. The processor can detect the entities using object detection, computer vision, machine learning model such as neural networks, statistical analysis, etc. The processor can identify the person from the video by for example performing face identification from the video data. In one example, the activity of the user can be correlated to the person identified in the video, such as a running partner, or a person involved in project A. The processor can determine the activity based on the person identified in the video.

To determine the activity the user is engaged in, the processor can also interface with various devices associated with the user to obtain nonvisual data. The nonvisual data can indicate the activity associated with the user. For example, the processor can obtain data from a GPS sensor, an accelerometer, and/or a mobile device such as a cell phone. The GPS sensor and/or the accelerometer can be mounted within an item associated with the user, such as a clothing item, glasses, contact lens, a watch, a necklace, an earring, a cell phone, etc. The data can provide speed and velocity information of the user and can aid in detecting whether the user is running, cycling, scooting, riding in a car, playing an aerial vehicle, etc.

In addition, the processor can obtain the nonvisual data from a calendar associated with the user, an email application associated with the user, or any software associated with the user. The software can provide information about a meeting location, time, place, and/or topic of discussion to help the processor identify the activity the user is engaged in. The software associated with the user can be a to-do list software, a project management software, timekeeping software, a browser extension of the timekeeping software, etc. Based on the nonvisual data obtained from various devices, software and the video, the processor can determine the activity in which the user is engaged.

To determine the activity the user is engaged in, the processor can also identify the activity based on a predefined set of categories and categorize the video into one or more categories in the predefined set of categories. The processor can obtain multiple categories indicating multiple activities associated with the user. The multiple categories can be a list of activities obtained from the user such as running, working on project A, working on project B, cooking, etc. The processor can also obtain the predefined set of categories from the history of activities associated with the user. The history of activities can be received from a database containing time entries associated with the user. The database can be associated with the timekeeping module 230 in FIG. 2, such as Clockify, Intapp, etc. The history of activities can also be obtained from the activity identification module 220 in FIG. 2.

The user can be engaged in multiple activities at the same time, for example, working on a project and eating, walking and talking on a cell phone, etc. The processor can identify multiple activities in which the user is engaged based on the video of the environment surrounding the user and can determine a primary activity among the multiple activities. Once the processor determines the primary activity, the processor can create a record including the primary activity and an amount of time the user is engaged in the primary activity. The record can be recorded in a database associated with the timekeeping module 230 in FIG. 2.

To determine the primary activity, the processor can use various factors. For example, the processor can determine primary activity based on the predefined set of categories. In a more specific example, if one of the identified activities is in the predefined set of categories, while the others are not, the processor can determine that the activity in the predefined set of categories is the primary activity.

In another example, the processor can determine primary activity based on a total amount of time spent on the multiple activities during the day. In a more specific example, if the multiple activities are working on project, talking on a phone and drinking coffee, the processor can determine a total amount of time during a single day that the user spent working on the project, talking on the phone and drinking coffee. Among the multiple activities, the processor can select as the primary activity the activity in which the user has engaged for the most amount of time during the day.

In another example, the processor can determine the primary activity upon completion of at least one activity, or all activities, among the multiple activities. The processor can determine a first amount of time during which the user has been continuously engaged in a first activity among the multiple activities and a second amount of time during which the user has been continuously engaged in a second activity among multiple activities. The processor can select a larger amount of time between the first amount of time and the second amount of time. The processor can designate an activity associated with the larger amount of time as the primary activity.

In another example, to determine the primary activity, the processor can ask for disambiguation from the user, as explained in FIG. 6. The processor can provide a visual indicator within the video of the environment surrounding the user, the visual indicator indicating the amount of time the user has engaged in the activity, as shown in FIGS. 3, 4, 5A.

To determine the activity, primary or otherwise, the processor can obtain entities associated with multiple activities. Multiple entities can include a monitor and a keyboard, which are associated with an activity of working; a running track and a particular person, which are associated with an activity of running; etc. The grouping of entities and associating them with an activity can be based on activities associated with the user as well as other people. The grouping of entities associated with the activity can be stored in a database, can be used to create a statistical model, and/or can be used to train the machine learning model such as a neural network. The processor can identify in the video of the environment surrounding the user a subset of entries in the multiple entries and can determine the primary activity in the multiple activities associated with the subset of entries.

Figure 10A:
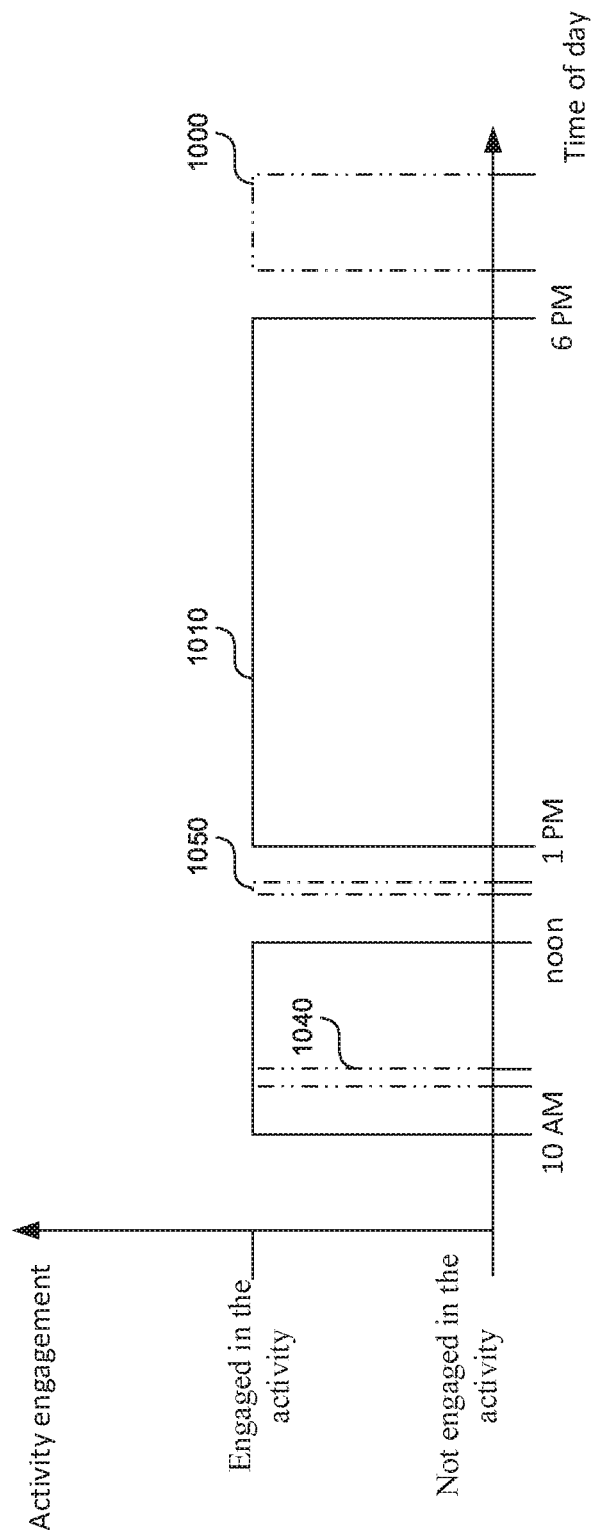
FIGS. 10A-10B each show a graph of various activities and their durations.
Figure 10B:
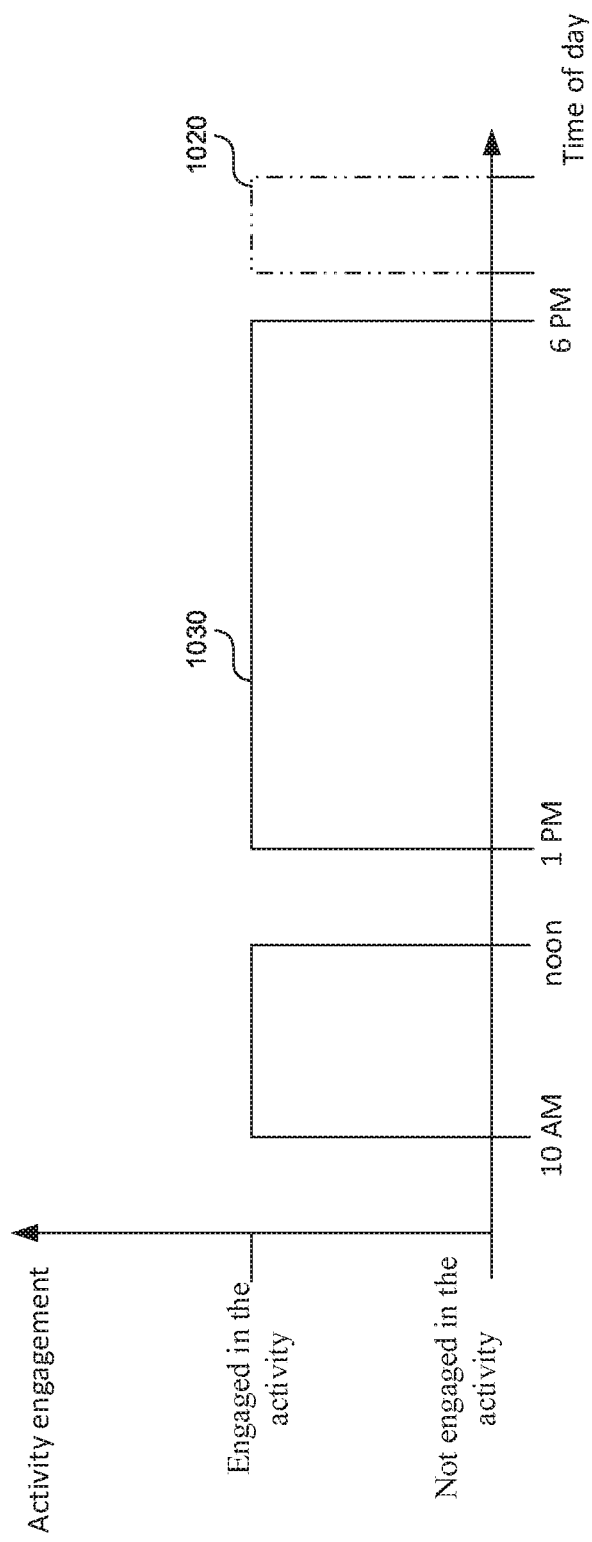

FIGS. 10A-10B each show a graph of various activities and their durations. Graphs 1000 and 1010 can be data obtained after a processor identifies the activities and their durations from a video of the environment surrounding the user. For example, graph 1000 can represent the activity "running," while graph 1010 can represent the activity "work on project A." The x-axis of the graph can represent a time of day, while the y-axis can represent whether the user is engaged in a particular activity.

The processor can perform filtering on the graphs 1000, 1010 to remove spurious data, and to obtain graphs 1020, 1030 in FIG. 10B, respectively. In one example, to perform the filtering, the processor can perform low-pass filtering of the graphs 1000, 1010 to obtain graphs 1020, 1030, respectively.

In another example, to perform the filtering, the processor can analyze each graph individually 1000, 1010 to determine an average duration of the activity, and an acceptable deviation from the average. For example, for the graph 1000, the average duration can be 30 minutes, with an acceptable deviation of 10 minutes, while for the graph 1010, the average duration can be 3.5 hours, with an acceptable deviation of 2 hours.

The processor can then filter the graphs 1000, 1010 to smooth out the data that falls outside of the average duration plus/minus the acceptable deviation. The acceptable deviation can be a multiple of standard deviation in a bell curve. As a result of smoothing, the peaks 1040 and 1050 of the graph 1000 can be removed to obtain the graph 1020.

The processor can determine the activity at a given time during the day using a two-step process. In the first step, the processor can determine the activity using any of the methods described in this application such as using the activity identification module 220 in FIG. 2. In the second step, at the end of a predefined time period, e.g., end of the day, the processor can perform the filtering to further refine the user's time entries, as described in FIGS. 10A-10B. The processor can use the filtering technique to determine the primary activity among multiple activities any given time, and/or to determine the activity from the video.

The processor can create a function 1000, 1010 representing a time duration during which the user was engaged in the activity. The processor can perform a filtering of the function to remove an atypical time duration, such as time durations 1040, 1050, to obtain graph 1020. After performing the filtering, the processor can automatically create the time entry representing the activity in which the user is engaged without including a time entry associated with the atypical time duration.

Computer

Figure 11:
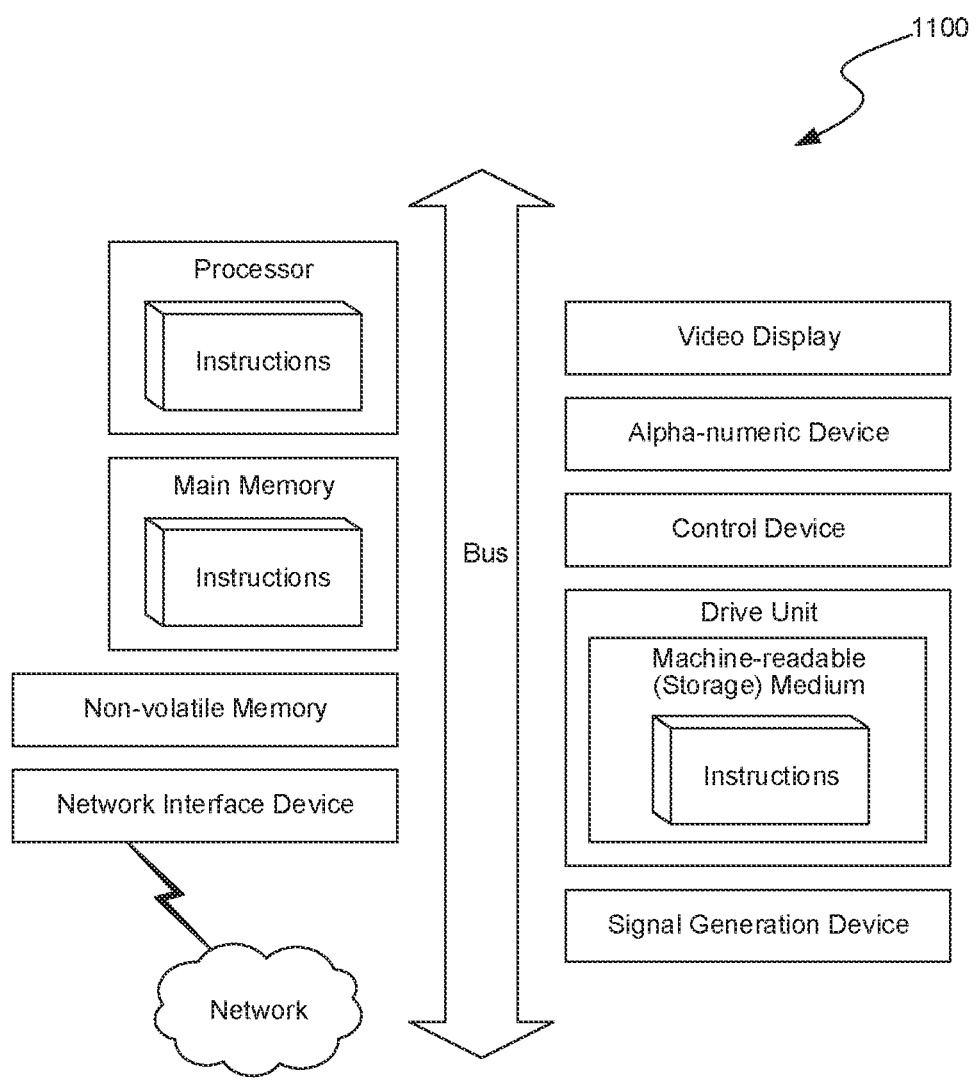
FIG. 11 is a diagrammatic representation of a machine in the example form of a computer system within which a set of instructions for causing the machine to perform any one or more of the methodologies or modules discussed herein may be executed.

FIG. 11 is a diagrammatic representation of a machine in the example form of a computer system 1100 within which a set of instructions, for causing the machine to perform any one or more of the methodologies or modules discussed herein, may be executed.

In the example of FIG. 11, the computer system 1100 includes a processor, memory, non-volatile memory, and an interface device. Various common components (e.g., cache memory) are omitted for illustrative simplicity. The computer system 1100 is intended to illustrate a hardware device on which any of the components described in the example of FIGS. 1-10B (and any other components described in this specification) can be implemented. The computer system 1100 can be of any applicable known or convenient type. The components of the computer system 1100 can be coupled together via a bus or through some other known or convenient device.

The processor of the computer system 1100 can perform any of the methods described in this application. For example, the processor can perform the methods of the activity identification module 220 in FIG. 2 and/or the timekeeping module 230 in FIG. 2. The processor can be integrated into an item associated with the user, such as glasses 130; a clothing item 140, such as a shirt collar 140, a hat 145; a contact lens 150; etc. The processor also can be a remote processor in communication with the item associated with the user using the network associated with the computer system 1100. The video display of the system 1100 can include the projector 160 in FIG. 1. The main memory, the nonvolatile memory and/or the drive unit can store a history of activity associated with the user including the user's time entries.

This disclosure contemplates the computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1100 may include one or more computer systems 1100; be unitary or distributed; span multiple locations; span multiple machines; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 11 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A system comprising:
a video recorder mounted on glasses configured to be worn by a user, the video recorder to record a video of an environment surrounding the user;
an activity identification module to determine an activity in which the user is engaged based on the video and to determine an amount of time the user is engaged in the activity, the activity identification module to:
create a function representing a time duration during which the user was engaged in the activity;
perform a filtering of the function to remove an atypical time duration;
upon said performing the filtering, automatically create the time entry representing the activity in which the user is engaged without including a time entry associated with the atypical time duration; and
a timekeeping module to record the time entry comprising the activity and the amount of time the user is engaged in the activity.

2. A method comprising:
receiving a video of an environment surrounding a user;
automatically creating a time entry representing an activity in which the user is engaged by determining, based on the video of the environment surrounding the user, an amount of time the user is engaged in the activity and the activity in which the user is engaged, said determining comprising:
creating a function representing a time duration during which the user was engaged in the activity;
performing a filtering of the function to remove an atypical time duration; and
upon said performing the filtering, automatically creating the time entry representing the activity in which the user is engaged without including a time entry associated with the atypical time duration.

3. The method of claim 2, comprising:
analyzing a plurality of time entries comprising the time entry to obtain a comparison between a plurality of activities associated with the plurality of time entries; and
presenting the comparison to the user.

4. The method of claim 2, said determining the activity comprising:
identifying an entity associated with the activity within the video; and
determining the activity in which the user is engaged based on the identified entity.

5. The method of claim 2, said determining the activity comprising:
obtaining nonvisual data from a device associated with the user, the nonvisual data indicating the activity associated with the user; and
determining the activity in which the user is engaged based on the nonvisual data and the video.

6. The method of claim 5, the device comprising a GPS sensor, an accelerometer, or a mobile device.

7. The method of claim 5, the data comprising data obtained from a calendar associated with the user, data obtained from an email application associated with the user, or data obtained from a software indicating a task associated with the user.

8. The method of claim 2, said determining the activity comprising:
obtaining a plurality of categories indicating a plurality of activities associated with the user; and
categorizing the video into one or more categories in the plurality of categories.

9. The method of claim 8, said obtaining the plurality of categories comprising:
receiving from a database a plurality of time entries comprising the plurality of activities associated with the user.

10. The method of claim 2, comprising:
based on the video of the environment surrounding the user, determining a plurality of activities in which the user is engaged;
determining a primary activity in the plurality of activities; and
creating a record comprising the primary activity and the amount of time the user is engaged in the primary activity.

11. The method of claim 10, said determining the primary activity comprising:
upon completion of at least one activity in the plurality of activities, determining a first amount of time during which the user has been continuously engaged in a first activity in the plurality of activities and a second amount of time during which the user has been continuously engaged in a second activity;
selecting a larger amount of time between the first amount of time and the second amount of time; and
designating an activity associated with the larger amount of time as the primary activity.

12. The method of claim 2, said determining the activity comprising:
obtaining a plurality of entities associated with a plurality of activities;
identifying in the video of the environment surrounding the user a subset of entries in the plurality of entities; and determining the activity in the plurality of activities associated with the subset of entries.

13. The method of claim 2, comprising:

providing a visual indicator within the video of the environment surrounding the user, the visual indicator indicating the amount of time the user has engaged in the activity.

14. A system comprising:

an image recorder configured to be worn by a user, the image recorder to record one or more images of an environment surrounding the user;

one or more processors to:
  determine, based on the one or more images, an activity in which the user is engaged and an amount of time the user is engaged in the activity, the one or more processors to determine comprising the one or more processors to:
    creating a function representing a time duration during which the user was engaged in the activity;
    performing a filtering of the function to remove an atypical time duration;
    upon said performing the filtering, automatically creating the time entry representing the activity in which the user is engaged without including a time entry associated with the atypical time duration; and
  create a time entry comprising the activity and the amount of time the user is engaged in the activity.

15. The system of claim 14, comprising an audio emitter, a microphone and a projector in communication with the image recorder, the audio emitter, the microphone, and the projector to facilitate communication between the user and the one or more processors.

16. The system of claim 14, the one or more processors to:
  identify at least two activities in which the user can be engaged;
  request from the user to select the activity from the at least two activities; and
  upon receiving a selection from the user, create the time entry comprising the activity and the amount of time the user is engaged in the activity.

17. The system of claim 14, the one or more processors to:
  determine a plurality of activities in which the user is engaged based on the one or more images of the environment surrounding the user;
  obtain a plurality of categories indicating a history of activities associated with the user; and
  determine the activity among the plurality of activities by identifying within the plurality of activities the activity associated with the history of activities.

18. The system of claim 14, the one or more processors to:
  identify from the one or more images a device with which the user is interacting;
  request from the device information about the interaction with the user; and
  determine the activity in which the user is engaged based on information.

19. The system of claim 18, the information comprising a software application running on the device with which the user is interacting.

* * * * *